United States Patent
Von Savigny

(10) Patent No.: US 7,620,684 B2
(45) Date of Patent: Nov. 17, 2009

(54) METHOD AND SYSTEM FOR ISSUING INFORMATION OVER A COMMUNICATIONS NETWORK

(75) Inventor: Hubertus Von Savigny, Freigericht (DE)

(73) Assignee: IPC GmbH, Freigericht (DE)

( * ) Notice: Subject to any disclaimer, the term of this patent is extended or adjusted under 35 U.S.C. 154(b) by 1299 days.

(21) Appl. No.: 10/385,860

(22) Filed: Mar. 12, 2003

(65) Prior Publication Data

US 2003/0154200 A1   Aug. 14, 2003

Related U.S. Application Data

(63) Continuation-in-part of application No. PCT/EP00/12415, filed on Dec. 8, 2000.

(51) Int. Cl.
   G06F 15/16   (2006.01)
   G06F 17/30   (2006.01)
   G06F 3/00    (2006.01)
   G06F 3/048   (2006.01)

(52) U.S. Cl. .................. 709/204; 709/206; 709/217; 715/751; 715/758; 715/759; 707/4; 707/10

(58) Field of Classification Search ............ 709/204, 709/206, 217; 707/4, 10; 715/751, 758, 715/759

See application file for complete search history.

(56) References Cited

U.S. PATENT DOCUMENTS 5,907,681 A * 5/1999 Bates et al. ............. 709/228

(Continued)

FOREIGN PATENT DOCUMENTS

DE   197 50 749 A1   5/1999

(Continued)

OTHER PUBLICATIONS

"Expertcity.com Shifts Paradigm in Online Help, Learning and Advice", Expertcity.com: Press Releases, Online, Dec. 16, 1999, pp. 1-2.

(Continued)

Primary Examiner—Kevin Bates
(74) Attorney, Agent, or Firm—David S. Safran; Roberts Mlotkowski Safran & Cole, P.C.

(57) ABSTRACT

A method and a system for issuing information over a communications network, in particular over the Internet, wherein a central computer communicates with at least one user computer of a user for data exchange, wherein at least one file page of the central computer is opened after the communications connection is established, such that a query can be posted via the user computer to the central computer for information to be obtained from the user, wherein the query submitted via the user computer is displayed on a page of the central computer and can be read and answered by other users of other user computers that are also connected to the central computer. To ensure that submitted queries are answered in the shortest possible time with qualified answers, a communications connection between the central computer and the other user computers is set so that the other users, who have registered online with the central computer as a logged-on responder to the submitted query, can read the query submitted via the user computer and sent via the central computer to the other user computer essentially at the same time, and status as a logged-on responder for answering the submitted query is granted to only a preset number of other users.

54 Claims, 1 Drawing Sheet

U.S. PATENT DOCUMENTS

| | | | |
|---|---|---|---|
| 5,948,054 A * | 9/1999 | Nielsen | 709/200 |
| 6,026,148 A * | 2/2000 | Dworkin et al. | 379/88.18 |
| 6,064,978 A * | 5/2000 | Gardner et al. | 705/10 |
| 6,131,085 A * | 10/2000 | Rossides | 705/1 |
| 6,223,165 B1 * | 4/2001 | Lauffer | 705/8 |
| 6,275,811 B1 * | 8/2001 | Ginn | 705/10 |
| 6,434,549 B1 * | 8/2002 | Linetsky et al. | 707/3 |
| 6,471,521 B1 * | 10/2002 | Dornbush et al. | 434/322 |
| 6,631,377 B2 * | 10/2003 | Kuzumaki | 707/10 |
| 6,745,178 B1 * | 6/2004 | Emens et al. | 707/3 |
| 6,826,596 B1 * | 11/2004 | Suzuki | 709/206 |
| 6,829,585 B1 * | 12/2004 | Grewal et al. | 705/8 |
| 6,898,631 B1 * | 5/2005 | Kraft et al. | 709/224 |
| 6,938,068 B1 * | 8/2005 | Kraft et al. | 709/203 |
| 7,120,647 B2 * | 10/2006 | Venkatesh et al. | 707/104.1 |
| 7,152,092 B2 * | 12/2006 | Beams et al. | 709/204 |
| 2003/0092455 A1 * | 5/2003 | Natsuno | 455/466 |
| 2004/0210550 A1 * | 10/2004 | Williams et al. | 707/1 |
| 2006/0036563 A1 * | 2/2006 | Wu | 706/59 |

FOREIGN PATENT DOCUMENTS

| | | |
|---|---|---|
| DE | 198 12 167 A1 | 9/1999 |
| GB | 2 329 046 A | 3/1999 |
| WO | WO 98/43170 | 10/1998 |
| WO | WO 00/50967 | 8/2000 |
| WO | WO 01/39017 A1 | 5/2001 |

OTHER PUBLICATIONS

Expertcity.com, "About Us/Howexpertcity Works/Our Technology/Frequently Asked Questions/Expert Rating System/Our Guarantee/Privacy Policy", Expertcity.com: A Human Behind Every Click, 'Online!, June 11, 2000, pp. 1-19.

Ackermann et al, "Anser Garden 2: Merging Organizational Memory With Collaborative Help", CSCW '96, Proceedings of the ACM 1996 Conference on Computer Supported Cooperative Work. Boston, Nov. 16-20, 1996, ACM Conference on Computer Supported Cooperative Work, New York, NY: ACM, US, Nov. 1996, pp. 97-105.

* cited by examiner

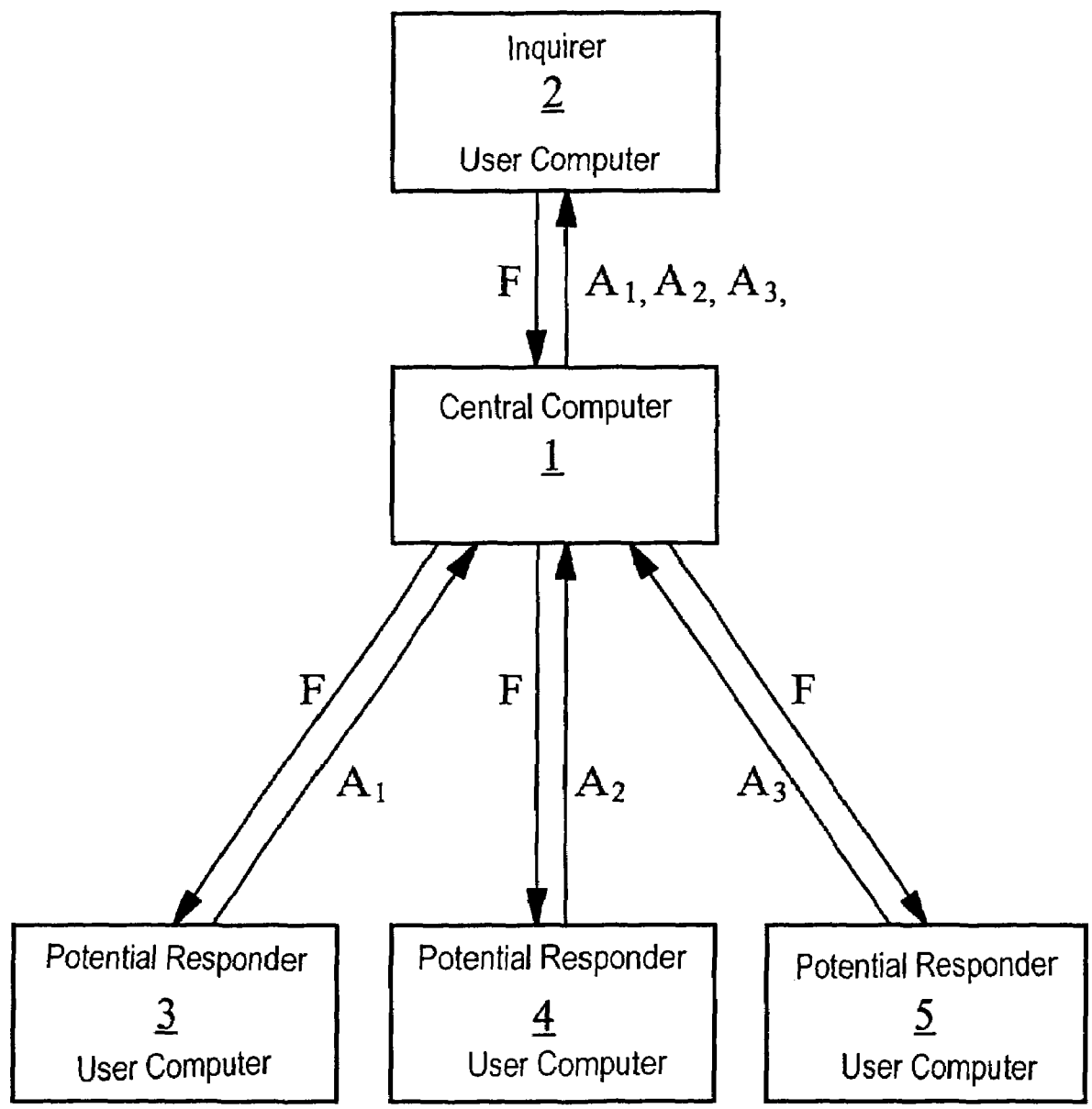

METHOD AND SYSTEM FOR ISSUING INFORMATION OVER A COMMUNICATIONS NETWORK

CROSS REFERENCE TO RELATED APPLICATION

This application is a CIP of International Patent Application PCT/EP00/12415 which designates the United States.

BACKGROUND OF THE INVENTION

1. Field of the Invention

The invention relates to a method and a system for issuing information over a communications network.

2. Description of the Related Art

A method and a system for issuing information over the Internet are already known in practice and from International Patent Application publication nos. WO 00/50967 and WO 98/43170. With the known system, queries in a large number of areas of knowledge are answered by a preset number of experts. The experts are previously registered as such for a specific area of expertise. Also, with the known system, a specific area of expertise has to be indicated for a submitted query. Then, the submitted query is forwarded to the experts responsible for this area of expertise, generally via e-mail. As soon as a query is answered, the inquirer is notified. The answers are evaluated and thus generate a qualitative selection of contributions. The experts are reimbursed for their answers. The drawback to this known method and system is that it takes a comparatively long time for a user asking a question to receive a qualified answer, rendering the known system uninteresting for a large number of users submitting queries.

SUMMARY OF THE INVENTION

An object of the present invention is, therefore, to provide a method and a system of the type initially outlined, wherein submitted queries are answered in the shortest possible time with qualified answers.

The above-mentioned object is solved by a method and system of the type initially outlined which, according to the present invention, includes communications connection between the central computer and the other user computers such that other users can read a query submitted via the user computer and communicated or forwarded via the central computer and via the other user computers essentially simultaneously, and the other users can be registered online with the central computer as a logged-on answerer of the submitted query, wherein status is granted to a logged-on answerer or responder to answer the submitted query of a predetermined and limited number of other users. It should be pointed out that the terms "user computer" or "other user computer" not only mean the respective computing unit as such, but also any associated hardware, in particular including keyboards and displays, monitors, or the like, on which the relevant information is shown.

The method and system according to the present invention differ from the prior art in various essential points. As an example, both the query submission and the response occur online, thus contributing a very positive effect to the response time. Also, each additional user can read the submitted query and log on for each query as a so-called privileged responder. As a consequence, the circle of potential responders is broadened to all users of the system, where they have the possibility of reading the submitted queries online and thus reacting immediately online. However, in the invention, it is not the case that just any user can answer a submitted query. Rather, there is an automatic restriction to the number of logged-on responders imposed by a corresponding granting of status made by the central computer. The above-mentioned measure serves to create a competitive situation amongst other users who want to attain the status of the logged-on responder, which generally results in other users frequently logging on as responders immediately after a query is posted. As is also the case in the prior art, it is associated with the status of the logged-on responder that he receives reimbursement, or the like, after making a (qualified) response to a query.

It is also understood that it is basically possible that other users, who have not attained the desired status of a "logged-on user" are able to answer a submitted query. These additional users, who then, likewise, act as responders but do not have the status of the logged-on responder, hence, do not receive any payment which only occurs under specific conditions.

Consequently, the invention results in that each and every query submitted is answered promptly and is generally of a high standard.

It is of particular advantage that the communications connection between the central computer and the other user computers is such that a new query from a user is shown automatically and at least substantially simultaneously on the other user computers without the assistance of the other users. In this way, new queries are automatically forwarded to all other users who are connected to the central computer.

It is basically possible to design the communications connection between the central computer and the other user computers as streaming or refresh, wherein in the latter case, the communications connection between the central computer and the other user computers is controlled in each case via a refresh signal triggered at regular or irregular time intervals preferably by the other user computers. The time interval between two refresh signals should be less than 5 seconds, preferably less than 2 seconds. It is also preferable that the time interval between two refresh signals can be adjusted individually by any other user.

The disadvantage of a streaming connection, in which permanent signals for updating purposes are output by the central computer, i.e., a permanent connection, is that it is relatively expensive and requires a comparatively high computer output and capacity. However, it does have the advantage of updating with minimal time delay. By way of comparison, the refresh connection is such that the (other) user computer requests the respective status at regular intervals, so that updating requires more time in this case.

To guarantee fast transfer, new queries are displayed via a display unit having at least one display window, wherein the display window is preferably several times smaller than the page on which the queries are displayed. In the process, a new query, or at least a part thereof, is shown on the page, without the page being reconstructed. As a result, only each modified status display is transferred by the central computer to the other user computers. If, for example, a responder status for a specific query is issued to another user, then only the affected window of the display unit is updated for the query in question.

In a particularly preferred embodiment, it is provided that the display unit of each further user computer is permanently connected to the central computer by means of streaming and/or the display unit of each additional user computer is controlled via refresh in regular or irregular time intervals triggered by the other user computers.

Since (other) users may frequently surf the Internet, and thus may not constantly have the page(s) of the central computer open, an alternative embodiment of the invention, as a solution to this problem, provides a communications connection between the central computer and the other user computers in such a way that the other users receive specific, randomly updating information of a file page of the central computer separate from the other unchangeable information of this page automatically without the assistance of other users, and displays on their other user computers, without the file page of the central computer being called up directly. An advantage of this arrangement is that the other users are constantly and automatically made aware or informed whenever new information is input, and also whenever the file page of the central computer has not been called up directly. This also leads to the submitted queries being answered with qualified answers in the shortest possible time.

It should also be pointed out that the above-mentioned arrangement according to the present invention can be realized not only with a method and a system for issuing information, but also wherever current information is to be made available to (other) users for a short period of time.

To enable a fast reaction of other users, the information is displayed immediately, or preferably a few seconds after it is updated in the central computer file, on the other user computers or on the corresponding displays.

Newly input information can be displayed in various ways. Basically, it is possible that the input of new information be merely displayed as an optical and/or acoustic signal on the other user computers. The interested (other) user then has to call up only the respective page of the central computer. It is also possible that fresh queries from users are displayed as information in abbreviated form in each case.

To bring the attention of the users to new queries, it is suggested that these be altered alerted to also by means of an optical and/or acoustic notification signal. In this respect, it is particularly preferred for new queries, even in abbreviated form, or additional updated information, which may be displayed in a pop-up window on the other user computers or in the window appearing after activating the page minimizing function on the taskbar in the browser of the other user computers.

It is also of particular advantage that the duration and/or the frequency of updating the display of information can be adjusted individually by the other user. The duration can be adjusted from less than a second to many minutes, if necessary, with several optical and/or acoustic notification signals.

In order to control the display of information in a particularly easy manner, without the page of the central computer file being accessed directly, the relevant software can be downloaded from the central computer per download to the other user computers.

With respect to the automatic restriction of the number of logged-on responders by corresponding granting of status, it is suggested that, for each query, the current status and/or also the maximum possible number of other users provided with granted status (i.e., logged-on responder) is displayed on the page via the display unit, wherein the maximum possible number for each query may be varied or may also remain constant. This can effectively further intensify the afore-mentioned competitive situation.

It is also desirable in this respect that the status for each query and/or the submitted answers are displayed as information for the inquirers to further increase informativeness.

To yet further intensify the afore-mentioned competitive situation in favor of rapid information transfer, status of the logged-on responders is granted in favor of each additional user according to the order of log-on as responder for the current query in the central computer. This leads the other users to react promptly after a query has been posted to attain the desired status.

In this respect, it is particularly desirable that status of logged-on responder is granted to only very few additional users, preferably 3 to 6 other users. Also, the very small number of maximum possible logged-on responders leads to further intensifying of the competitive situation, particularly since payment has to be divided amongst a small number of responders so that each single responder can be paid more.

In this respect, it is favorable for the display unit to have at least one display window that is preferably several times smaller than the whole page, and for the granted status of a new logged-on responder to be displayed on the page via the display unit without the page having to be refreshed. The display unit according to the present invention ensures that data can be transferred from the central computer to other individual user computers and the screen or page can be created very quickly on the other user computers, since only the very minimal quantity of data of a display window has to be transferred for a new or modified status and not the voluminous quantity of data of a whole page.

It is desirable for a new logged-on responder to be displayed on the page with the shortest possible time delay, for example, less than 10 seconds, and preferably, less than 2 seconds. This effectively ensures that the system shows the current number of already logged-on responders in a very short reaction time so that the other users are informed of the status of a query almost in real time, thus clearly reducing the risk of a log-on happening too late. The display of the number of the already logged-on responders is updated via the display unit, preferably without the assistance of the user or another user, i.e., automatically and without the page having to be continually refreshed when the number of users changes, whereby the other users can pay more attention to reading the query.

In order to provide an even more efficient method and system available and to allow the other users to react even faster to a submitted query, granting of status as a logged-on responder is displayed to every other user with a very short time delay after log-on.

In order to quickly and simply dispense advice to another user after having logged-on to the central computer and having successfully been granted a status as logged-on responder, a response input page of another file of the central computer is made accessible to the other user so that an answer can be input directly.

For the sake of clarity and also to accelerate the response procedure, the submitted query is displayed in a type of table along with a substantial number of other already submitted queries on the page, wherein the queries displayed in the query display table are shown according to time of receipt and the last received query is shown in a first position.

Since the query display table can only have a preset capacity, it has a preset number of fields or lines for submitted queries without forfeiting clarity, wherein after the maximum number is exceeded, the last query in the query display table is deleted from the query display table and is displayed on another page of the so-called "open query page" of the central computer where it can also be accessed. It is understood that the above-mentioned method of granting status can be used identically for queries on another page, where the maximum number of logged-on users is not yet reached.

To enable the other users to have prompt information and therewith the same chance of reading the new query titles, the present invention provides updating the display of submitted queries via the display unit, preferably in a query display table, without the assistance of the user or another user. In this way, all other users are automatically kept up-to-date, the competitive pressure is further enhanced.

Since the status of a query changes much more often, and thus faster, than the query itself, the present invention provides a display of the number of already logged-on responders that is updated at briefer intervals than the updating of the display of submitted queries, wherein all other responders are updated simultaneously as fast as possible. It is proposed that the communications connection between the central computer and the user computer or the other user computers for updating the display of the number of already logged-on responders to be configured as streaming connection, whereas the update of the display of already submitted queries to be configured as refresh connection. However, it should be pointed out that it is also possible to use only streaming or only refresh connections.

In any case, regardless of the type of communications connection for updating, as previously disclosed, each page is not completely reconstructed, rather only individual windows of the display unit. If, for example, responder status is granted to another user for a specific query, then only the relevant window of the display unit is updated for the query at hand. The same applies whenever a new query is submitted.

In this case also, only one line of the display unit is refreshed in the query display table. All other lines are then shifted in the query display table. In the end, the display unit exhibits a plurality of windows for each low-volume file on the relevant pages to be able to update quickly without the whole page always having to be refreshed.

Since information or an answer to a submitted query is required at a certain time, depending on users, it is provided, according to the present invention, that the inquirer provides a maximum display time for displaying the query submitted by him on the page or the other page (i.e., open query page). Preferably, the remaining display time is displayed, if the query is displayed on the other page. The advantage here is that the other users are constantly informed of the remaining run time of the query and can thereby estimate whether they have sufficient time for their own database search to respond to the query.

Again, for the sake of clarity, but also in order to answer the submitted queries according to priority, the queries are arranged on the page in the query display table and/or the other page in another type of table or query display table in the sequence of remaining display time, wherein the query with the shortest remaining display time is shown in a first position.

In order to give the logged-on responder the opportunity to reply to the submitted query without excessive time pressure and as precisely as possible, he is granted a preset response time to answer the query. At the same time, it is desirable that the response time is independent of the remaining display time of the submitted queries on the query display table. Upon the expiration of the response time—without the submitted query having been answered—the responder preferably receives no further payment, or the query can no longer be answered by the logged-on responder. The status display on the query display table on the page or the other page of the central computer is then moved back one position so that another new user can log on as responder.

In order to constantly inform the logged-on responder and, if required, the inquirer waiting for his answer of the remaining response time, it is proposed to display this time in the form of a preferably backwards running countdown which begins to run, in particular, from when status is granted to a user as logged-on responder.

If there is no success in answering the submitted queries and those on display in the query display table within the displayed time, these queries are deleted from the query display table and/or the other query display table. The same likewise applies to answered queries, insofar as they have been answered by all logged-on responders.

In order to be able to access the queries and their answers at a later time and also in the interests of providing proof, the queries and the given answers are stored in a database. Also, after the display time has expired, any queries remaining unanswered are stored and can be called up via the central computer for future analysis.

In order to facilitate the input of later queries for an inquiring user, an evaluation system is provided for evaluating the submitted queries according to clarity, objectiveness, or the like by the other user or logged-on responder, wherein the evaluation outcome to the submitted query is forwarded to the inquirer following the input of each evaluation or preferably by sending the (individual) answers. The result is an effective feedback by the other user or logged-on responder to the inquirer to help improve the quality of future queries.

The answer is displayed in the form of a URL (uniform resource locator), offering a series of substantial advantages. A URL is, as a rule, brief, succinct and checkable. On the Internet, it represents a signpost, by which a corresponding link to a particular address can be created immediately. It is known in exclusively computer-controlled search engines to give URLs as answers to keywords. The problem here, however, is that not only a lot of answers are usually in response to a query given, but that the quality of the answers can be very poor in any case. In the category-forming prior art, the answers are given by people in the form of written text. This can easily lead to unclear phrasing, misunderstandings and erroneous interpretation of the supplied answers. Furthermore, the answers are influenced very strongly by the personal opinion of the responders. It is also frequently ascertained that a personal need for recognition by the responders has a negative influence on the supplied answers. Departing from the known method and system, the present invention works with quasi-human search engines, wherein generally only a few outstanding answers from quality point of view are issued in a comprehensive and common language, namely as a URL, which is usually input by the responder by cutting and pasting the corresponding address from the address bar of his Internet browser or by means of a special address administration program.

Since the answer to a submitted query is meant only for the inquiring user, there is provision for it to be shown only to the inquirer.

Preferably, each answer is forwarded to the inquirer immediately after it is answered, as the inquirer is interested in a prompt response. All supplied answers can be forwarded to the inquirer on expiry of the display time and/or response times, thus enabling comparative evaluation of the answers by the inquirer.

To enable inquiries between the inquirer and the logged-on responder online and without any time delay a chat system is provided according to the present invention, which is preferably accessible only to the inquirer and to each of the logged-on responders.

To ensure the quality of the information, an evaluation system that is accessible only to the inquirer is provided for inquirers for evaluating the supplied answers. The user himself, thus, decides which of the given answers was acceptable or not acceptable. For this purpose, the evaluation system has a plurality of preset classifications for evaluating the supplied answers by the inquirer to facilitate evaluation for the user and to ensure comparability.

In order to prevent misuse of the method and system according to the present invention, a monitoring system for detecting logged-on responders is provided for answers evaluated as negative. The monitoring system is preferably designed such that after a preset number of negatively evaluated answers is received from a particular user, the user is no longer authorized by the central computer to be a logged-on responder, or such a status is not to be granted to the user.

It is also of particular advantage that the user does not need to select a category and/or subject area or the like when entering his query. In this respect it is also desirable that the other users do not need to indicate any subject area or the like to be granted the status of "logged-on responder." This constitutes a substantial advantage over the prior art, where an inquirer always has to decide on a specific subject area when inputting a query. The queries are then forwarded only to the experts authorized for this subject area, who have previously logged on as experts for the subject area in question. The aforementioned known method can be disadvantageous because it can attract a possibly incorrect estimation of the respective subject areas by the inquirer. Due to the configuration according to the present invention, such a classification occurs neither on pages of the inquirer nor on pages of the authorized responders. Errors made by the inquirer when estimating the respective subject areas cannot arise through this. Moreover, interdisciplinary queries can be better answered.

BRIEF DESCRIPTION OF THE DRAWINGS

The sole FIGURE is a flow chart represent steps of the method according to the present invention.

DESCRIPTION OF THE PREFERRED EMBODIMENT

The features of the method or system according to the present invention is described herein below with reference to an example which is illustrated in the sole FIGURE.

In order to obtain information using the method or system according to the present invention a user, who would like to post a query and who is consequently designated as an inquirer, with his user computer 2, must first call up the corresponding page of a platform via a central computer 1 in or via the Internet and must be registered or complete a so-called log-on by inputting a user name and password by accessing a number of pages. Also connected to the system are other user computers 3, 4, 5 which are connected via the internet to the central computer 1. It is noted that the showing of only one user computer 2 and three other user computers 3, 4, 5 is only an example and not a restriction on the invention. In fact, multiple user computers and multiple other user computers may be connected to the system according to the invention.

As soon as the inquirer has been adequately identified by the central computer 1, he can post his query F on the respective user page of the user platform. To do this he simply has to click on a "post query" button on the home page. As soon as the query input page of the central computer 1 is generated, the inquirer can enter his query using the keyboard of his user computer 2 into text input fields provided for this purpose. One of these text input fields is specified for an explanatory query title. The query F later appears under this query title in a query display table. The actual query F is to be entered into another text input field, always beginning with, for example, the phrase "Where on the Internet do I find . . . " or the like, as the method and system according to the present invention provides that the answers can be given out only in the form of concrete Internet addresses, so-called URLs. Next to this are two more text input fields to be filled in optionally by the inquirer and whose content is meant to help the other users of the method or system according to the present invention, who are the potential responders, to understand exactly on which level the inquirer is and what is his/her main focus.

After the query F has been entered, the inquirer then selects how long his query should appear on the query display table and how the response service is paid. Entering a specific subject area is not required.

After a special program on the central computer 1 has checked that the query F contains no indexed words, i.e., references to child pornography, etc., for example, it is displayed on a special query display table on the responder page of the responder platform, including its query title and status display, to be explained in greater detail below. A "read query" button is also on this page.

It is noted that the user platform and the responder platform are adapted differently to the respective group. On the user platform, each user may register himself as an inquirer, which is not possible on the responder platform. The responder platform may only be entered by admitted responders, so-called "logged-on responders". This can only be done on this platform. On the inquirer platform, there is an inquire page, which is not on the responder platform, so that it is only possible to enter questions on the inquire platform. On the responder platform is a responder page, which is not on the user platform, so that it is only possible to give answers at the responder platform. Only on the inquirer platform money can to be paid from the inquirers for their inquiries but not on the responder platform. Only on the responder platform it is possible for the logged-on-responders to withdraw their reimbursement.

By clicking on the respective "read query" button, the potential responders, who have constant access via their other user computers 3, 4, 5 to the content of the query display table, can display each individual query F in full, including the optional constituents, if required, on their own query reading page so that the potential responders can decide, after reading, whether they would like to answer the respective query. An "answer query" button is found on each query reading page. As soon as a user willing to supply an answer A, he clicks on this button and receives the "logged-on responder" status from the central computer for the relevant query unless the set number of logged-on responder had already been reached at this point. In this case the (additional) user may be informed that he has unfortunately logged on too late to answer the query. The number of users provided with the "logged-on responder" status is continuously updated and displayed on the above-mentioned status display. The other willing users are accordingly informed of whether the respective query F is yet to be answered.

It is important that all users are considered as potential responders for each individual query, and thus there is no grading for expertise for specific subject areas.

In the event, that a user willing to answer has logged on in time, his monitor shows a special answer entry page displaying the text of the query in the upper half and two fields for entering the answer in the lower half. The URL, thus the explicit Internet address, of the web page containing the answer is to be entered in one of the answer input fields, which the responder will generally do by copying the corresponding address from the address bar of his Internet browser or from a special address administration program. He can also enter the URL manually, that is, via his keyboard. The second field allows the responder to supply additional details as desired.

After the responder has finished entering his answer A, he actuates a "send answer" button on the answer input page. His answer A is immediately forwarded via the central computer to the user computer of the inquirer, as long as the latter is currently online to the central computer. Otherwise, the answer A is forwarded to an electronic mailbox on the central computer 1 of the user and stored there until it is called up. The answers A1, A2, A3 appear on the user computer 2 of the inquirer in a type of table on a special answer receipt page of the inquiry platform. On this page, the inquirer is also shown how many responders are currently occupied with answering his query F and when, at the latest, he should expect the respective answers A so as to guarantee the greatest possible awareness for the waiting inquirer.

After the answers A1, A2, A3 are entered on the answer receipt page, the inquirer can open each individual answer by clicking on the respective answer URL and then getting each answer page displayed directly in a window opening on his monitor, where, at the same time, he can view the optional commentary of the responder, for example, in the form of another small window.

After the inquirer has viewed the page sent by a responder he is required to grade the answer in terms of its subjective usefulness for himself as inquirer. Four evaluation alternatives are presented to him for this purpose, which are:

1) very helpful
2) helpful
3) less helpful
4) not helpful

Evaluation of pages of the central computer is preset to a default evaluation of "helpful," which means that the answer is evaluated automatically with "helpful," if the inquirer does not make any change to the grading. This grading allows the inquirer to evaluate the next answer as better, the same or worse. As soon as the inquirer has clicked on, checked and evaluated all answers A1, A2, A3, he can again correct the evaluation after checking all answers. Further, his monitor displays a log-out option requesting that he log on again to the system in the future for a new query.

The evaluation of the usefulness of the answers $A_1 \ldots A_n$ on the part of the inquirer forms the basis for distributing payment among the logged-on and authorized responders. The standing of responders is determined automatically according to the following plan by the central computer without additional human intervention: First, it depends only on qualitative evaluation by the inquirer. Where two answers receive identical evaluation, the time of receipt of the answer in the central computer decides on the order of rank of the responders. Only the responders ranked on ranking order 1, 2 and 3 receive payment, where payment for rank 1 is twice as high as for rank 2 and this in turn is twice as high as for rank 3. In this way, it should be ensured that, first, the answers are of high quality and secondly that they are delivered as fast as possible without compromise to quality.

If a particular user is not directly connected to the central computer, it is still possible for the user to receive prompt notification of a new query, if he has made provision for this by installing corresponding software. In this case, the submitted query appears in abbreviated form, for example, in a pop-up window, alerted by an acoustic alert signal. The user can then establish a communications connection with the central computer if needed, read the query in its entirety, if required, and log on as responder as described hereinabove.

I claim:

1. A method for issuing information over a communications network, comprising the steps of:

establishing a data exchange communications connection between a central computer and at least one user computer of a user;

opening at least one page of a file of the central computer after the communications connection is established;

obtaining information by posting of a query from the user computer to the central computer;

displaying the query submitted via the user computer on a page of the central computer in a manner enabling the query to be read and answered by other users of other user computers that are also connected to the central computer and who have obtained status as a logged-on responder by having registered online with the central computer to be able to answer the query, said query also being sent via the central computer to the other user computers essentially at the same time, and limiting the number of other users who are able to be logged-on responders for answering the query to only a preset number of logged-on responders with all users being eligible to become logged-on responders for each individual query without regard to expertise in specific subject areas and without regard to the nature of the answer so long as registration for status as a logged-on responder is sought before said preset number of logged-on responders is reached.

2. The method according to claim 1, wherein the communications network over which data exchange communications is established is the Internet.

3. A method according to claim 1, wherein displaying of a new query, posted by the user via the communications connection between the central computer, is provided on the central computer and on the other user computers almost simultaneously without the assistance of the other users.

4. A method according to claim 1, wherein a streaming connection is used as the communications connection between the central computer and the other user computers.

5. A method according to claim 1, wherein a refresh signal is used to control the communications connection between the central computer and the other user computers, the refresh signal being triggered at set time intervals.

6. A method according to claim 5, wherein said time intervals are set by the other user computers.

7. A method to claim 5, wherein time intervals between refresh signals is less than 5 seconds.

8. A method according to claim 5, wherein the time intervals between refresh signals is individually user adjustable.

9. A method according to claim 1, wherein a new query is displayed via a display unit having at least one display window that smaller than a whole page, and wherein at least a part of the new query is displayed on the page without the page having to be refreshed.

10. A method according to claim 1, wherein only a modified status of a status display is transferred from the central computer to the other user computers.

11. A method according to claim 1, wherein displays of the other user computers are connected to the central computer by a streaming connection.

12. A method according to claim 1, wherein displays of the other user computers are connected to the central computer with a refresh triggered by the respective other user computers.

13. A method according to claim 1, wherein information is displayed on the other user computers with a delay of less than one minute after updating in a file of the central computer.

14. A method according to claim 1, wherein information is displayed on the other user computers and at least one of an optical and acoustic notification signal is produced.

15. A method according to claim 1, wherein additional updated information is displayed in a window appearing on a task bar of a browser of the other user computers after activating a page minimizing function.

16. A method according to claim 1, wherein at least one of a duration and a frequency of updating information is adjustable individually by each other user.

17. A method according to claim 1, wherein software for controlling the display of information is downloadable from the central computer to the other user computers without the page of the central computer file being accessed directly.

18. A method according to claim 1, wherein at least one of a current number and said preset number of logged-on responders is displayed.

19. A method according to claim 1, wherein a status for at least one of each query and submitted answers are displayed to the other users.

20. A method according to claim 1, wherein "logged-on responder" status is granted giving priority to each other user according to the time of receipt of log-on as a responder for responding to the query.

21. A method according to claim 1, wherein status as a logged-on responder is granted to fewer than 15 other users.

22. A method according to claim 1, wherein granting of status to a new logged-on responder is displayed via a display window on the page, without the page having to be refreshed.

23. A method according to claim 1, wherein a current number of logged-on responders is displayed via a display unit.

24. A method according to claim 1, wherein a newly logged-on responder is displayed on the page with a time delay of less than 10 seconds.

25. A method according to claim 1, wherein a display of the number of logged-on responders is updated without assistance from the user or the other users.

26. A method according to claim 1, wherein granting of status as a logged-on responder is shown to each other user.

27. A method according to claim 1, wherein an answer input page of a file of the central computer is accessible to each other user for displaying the status of the logged-on responder.

28. A method according to claim 1, wherein each new query is displayed in a query display table along with a number of already submitted queries.

29. A method according to claim 28, wherein queries displayed in the query display table are displayed according to time of receipt, wherein a last entered query is shown in a first position.

30. A method according to claim 28, wherein the query display table has a preset number of positions or lines for submitted queries and after the maximum number has been exceeded, the last query in the query display table is deleted from the query display table and is then displayed on another query page in the central computer.

31. A method according to claim 28, wherein the display of the submitted queries on the query display table is updated without the assistance of the user or other users.

32. A method according to claim 1, wherein a display of the number of already logged-on responders is updated at shorter time intervals than updating of the display of submitted queues.

33. A method according to claim 30, wherein an inquirer sets a maximum display time for displaying the query submitted by the inquirer.

34. A method according to claim 33, wherein an amount of said maximum display time remaining is displayed whenever the query is shown on another page.

35. A method according to claim 33, wherein the queries on a page in the query display table are shown in order of display time remaining, such that a query with the shortest remaining display time is displayed in a first position.

36. A method according to claim 1, wherein a preset response time for answering the query is granted to each logged-on responder.

37. A method according to claim 1, wherein a remaining response time is displayed continuously for a logged-on responder, and the response time begins to run as a countdown from when status is granted to an other user as a logged-on responder.

38. A method according to claim 33, wherein queries remaining unanswered after expiry of the display time are deleted from the query display table.

39. A method according to claim 1, wherein queries and supplied answers are stored in a databank.

40. A method as claimed in claim 1, wherein queries remaining unanswered after expiry of a maximum display time are stored and can be accessed for analysis via the central computer.

41. A method according to claim 1, wherein an evaluation system is provided for evaluating the submitted queries for at least clarity and objectiveness by the other users or logged-on responders.

42. A method according to claim 41, wherein the user is informed of an evaluation result to the query submitted thereby.

43. A method according to claim 1, wherein each answer is presented as a URL.

44. A method according to claim 1, wherein at least one answer to a submitted query is shown only to the posting user, and each answer is forwarded directly after answering to the user 45. A method according to claim 1, wherein all submitted answers are forwarded to the user on expiration of a period set for receiving responses.

46. A method according to claim 1, wherein a chat system is provided for communicating between the user and the logged-on responders.

47. A method according to claim 46, wherein the chat system is accessible only to the inquirer and to each of the logged-on responders.

48. A method according to claim 1, wherein an evaluation system is provided to the user for evaluating answers supplied.

49. A method according to claim 48, wherein the evaluation system is accessible to only the user.

50. A method according to claim 48, wherein the evaluation system has a plurality of preset classifications for evaluating the answers supplied.

51. A method according to claim 48, wherein a monitoring system is provided to detect responders with negatively evaluated answers.

52. A method according to claim 51, wherein, after a preset number of negatively evaluated answers from a particular one of the other users, the central computer prevents the particular other user from being authorized as a logged-on responder.

53. A method according to claim 1, wherein said step of obtaining information by posting of a query comprises the optional selecting of at least one of a category and a subject area.

54. A method according to claim 1, wherein a step of obtaining status as a logged-on responder by other users comprises indicating an area of expertise.

* * * * *